US00RE34911E

United States Patent [19]

Glemza

[11] E Patent Number: Re. 34,911

[45] Reissued Date of Patent: Apr. 18, 1995

[54] HIGH PORE VOLUME AND PORE DIAMETER ALUMINUM PHOSPHATE

[75] Inventor: Rimantas Glemza, Baltimore, Md.

[73] Assignee: W. R. Grace & Co.-Conn., New York, N.Y.

[21] Appl. No.: 85,656

[22] Filed: Jul. 1, 1993

Related U.S. Patent Documents

Reissue of:

[64] Patent No.: 5,030,431
Issued: Jul. 9, 1991
Appl. No.: 362,545
Filed: Jun. 7, 1989

U.S. Applications:

[63] Continuation-in-part of Ser. No. 188,808, May 2, 1988, abandoned, which is a continuation of Ser. No. 770,550, Aug. 29, 1985, abandoned.

[51] Int. Cl.[6] ..... B01J 27/18
[52] U.S. Cl. ..... 423/305; 502/208
[58] Field of Search ..... 502/202, 208, 210, 214; 423/305, 306

[56] References Cited

U.S. PATENT DOCUMENTS 3,342,750 9/1967 Kearby .
3,904,550 9/1975 Pine .
4,080,311 2/1978 Kehl .
4,210,560 7/1980 Kehl .
4,219,444 8/1980 Hill et al. .
4,289,863 9/1981 Hill et al. .
4,364,842 12/1982 McDaniel et al. .
4,364,854 12/1982 McDaniel et al. .
4,364,855 12/1982 McDaniel et al. .
4,385,994 5/1983 Wilson et al. .
4,397,765 8/1983 McDaniel et al. .
4,444,962 4/1984 McDaniel et al. .
4,444,964 4/1984 McDaniel et al. .
4,444,965 4/1984 McDaniel et al. .
4,547,479 6/1985 Johnson et al. .
4,769,429 9/1988 Furtek .

FOREIGN PATENT DOCUMENTS

6520/74 2/1974 Australia .
0090374 10/1983 European Pat. Off. .

OTHER PUBLICATIONS

Kearby-Int. Cong. Cat.-2567-79; 1960.
Moffat-Cat. Rev.-Sci. Eng.-18/199-258; 1978.
Marcelin et al.-J. of Cat.-83/42-49; 1983.
Grebenki et al., "Synthesis and Study of Porous Aluminophosphates"; Inorg. Chem (86:507); 1977.

*Primary Examiner*—George Fourson
*Attorney, Agent, or Firm*—Mary Ann Capria

[57] ABSTRACT

Aluminum phosphate compositions arc provided which are characterized simultaneously by high porosity and phosphorous-to-aluminum ratios of approximately 1.0. The high porosity of these compositions is a function of high pore volume coupled with low surface area, resulting in high average pore diameter. These materials have excellent properties as catalysts and catalyst supports.

5 Claims, No Drawings

HIGH PORE VOLUME AND PORE DIAMETER ALUMINUM PHOSPHATE

Matter enclosed in heavy brackets [ ] appears in the original patent but forms no part of this reissue specification; matter printed in italics indicates the additions made by reissue.

This application is a continuation-in-part of copending U.S. Ser. No. 188,808, "High Pore Volume Aluminum Phosphate" (R. Glemza), filed May 2, 1988, which in turn is a continuation of U.S. Ser. No. 770,550, filed Aug. 29, 1985 both now abandoned.

BACKGROUND OF THE INVENTION

This invention is for aluminum phosphate compositions which are characterized by having both high porosity and phosphorus-to-aluminum (hereinafter "P/Al") ratios near unity. The high porosity of these compositions is characterized by a combination of high pore volume and low surface area, resulting in high average pore diameter. These compositions are useful as cracking catalysts, supports for ethylene polymerization catalysts, flatting agents, carriers, adsorbents and thickeners.

Synthetic aluminum phosphates are known and the utility and properties of various compositions have been discussed extensively in the literature. For example, Kearby, 2nd Int'l Congress and Catalysis, "New $AlPO_4$ Gels As Acid Catalysts," pp. 2567-79 (1960, Paris) and Moffat, Catal. Rev. - Sci. Eng., "Phosphates As Catalysts," Vol. 19, pp. 199-258 (1978) discuss the properties of various aluminum phosphates, reporting surface areas of about 200.0 to 500.0 $m^2$/gm and pore volumes (hereinafter "PV") of about 0.45 to 0.78 cc/gm.

Aluminum phosphate-containing compositions also have been described, as in U.S. Pat. No. 3,904,550 (Pine) which discloses a catalyst support comprised of alumina and aluminum phosphate with P/Al=0.54 and PV=1.34 cc/gm; U.S. Pat. No. 4,210,560 (Kehl) which discloses magnesia-alumina-$AlPO_4$ catalyst supports with P/Al=0.21 and PV=1.11 cc/gm or with P/Al=0.69 and PV=0.72 cc/gm; and Marcelin et al., J. of Catal., "Alumina-Aluminum Phosphate As Large-Pore Support and Its Application to Liquid Phase Hydrogenation," Vol. 83, pp. 42-49 (1983) which discloses alumina-aluminum phosphate supports with P/Al=1.0 and PV=0.32 cc/gm or with P/Al=0.5 and PV=0.64 cc/gm.

U.S. Pat. Nos. 4,364,842 and 4,444,965 (McDaniel et al.) disclose aluminum phosphate-containing catalyst bases in which P/Al=0.7-0.9 and in which the highest PV disclosed was 0.84 cc/gm (for P/Al=0.80).

Many of the prior art compositions share the same limitation. As the P/Al approaches unity, the pore volume of the prior art compositions decreases. Typically, aluminum phosphate compositions were not prepared with both these characteristics: a P/Al near unity and a high pore volume (i.e., PV of at least 1.0 cc/gm). High pore volume is very desirable for aluminum phosphate compositions used as polymerization catalysts due to their polymerization characteristics.

U.S. Pat. No. 3,342,750 (Kearby) discloses aluminum phosphate gels with PV of 1.39-1.56 cc/gm and surface area (hereinafter "SA") of 427-523 $m^2$/gm, resulting in average pore diameters of 65-114 Angstroms. Kearby teaches a high PV composition which also has a P/Al near unity, but it can be seen that the high PV is achieved at the expense of pore diameter, which is low. It is taught, in U.S. Pat. No. 4,769,429 (Furtek), that high average pore diameter is a very desirable characteristic for polymerization catalysts. In providing catalysts supports with high PV and low SA, the compositions of the invention achieve this combination of properties and provide aluminum phosphate catalyst supports having high average pore diameters.

SUMMARY OF THE INVENTION

The compositions defined and described herein are aluminum phosphate compounds with a unique combination of properties. These aluminum phosphates are characterized by high porosity. The compositions combine high pore volumes of at least 1.0, preferably at least 1.3 cc/gm, with low surface areas of 200-400 $m^2$/gm, resulting in high average pore diameters of at least 125 Angstroms, preferably at least 150 Angstroms. At the same time, the ratio of phosphorus to aluminum in the compositions is close to unity.

It is the primary object of this invention to provide stoichiometric aluminum phosphates with high porosity. Compositions of this description find particular utility when used as cracking catalysts or as supports for polymerization catalysts. A related object is to provide polymerization catalysts in which the catalytically active ingredients either are incorporated into the aluminum phosphate support of this invention by cogelling or by post-impregnation. It is also an object to provide high pore volume and high average pore diameter aluminum phosphates which are useful as flatting agents, flavor carriers, adsorbents and thickeners.

DETAILED DESCRIPTION OF THE INVENTION

High porosity stoichiometric aluminum phosphate compositions are described herein. The compositions of this invention comprise aluminum phosphate in which phosphorus and aluminum are present in a ratio of close to unity. For purposes of this description, close to unity shall mean that the ratio is at least 0.8, preferably at least 0.9, and most preferably closer to 1.0. If the ratio of a given composition is not precisely 1.0, aluminum should predominate over phosphorus. The described aluminum phosphates are further characterized by high pore volume and low surface area, resulting in high average pore diameter. This combination of characteristics is referred to herein as "high porosity." Pore volume is at least 1.0, preferably at least about 1.3 cc/gm, and surface area is between about 200 and about 400 $m^2$/gm. The compositions are thermostable up to at least 700° C. and are further characterized by a lack of crystallinity, that is, they will remain amorphous, even at temperatures in that vicinity. These properties make the aluminum phosphates of this invention ideal for catalyst applications.

The aluminum phosphates of this invention are conveniently prepared by the following method, although variations may be suitable. The compositions are made by neutralization of an acidic aqueous solution of aluminum and phosphate ions. Suitable solutions may be formed from aluminum salts and phosphate salts. The aluminum salts may be aluminum nitrate ($Al(NO_3)_3.9H_2O$), aluminum chloride hydrate ($AlCl_3.6H_2O$), aluminum bromide ($AlBr_3.6H_2O$ ), aluminum bromate ($Al(BrO_3)_3.9H_2O$), aluminum chlorate ($Al(ClO_3)_3.6H_2O$), or aluminum iodide hydrate ($AlI_3.6H_2O$). The phosphate salts may be orthophosphoric acid ($H_3PO_4$), ammonium phosphate ($NH_4H_2PO_4$), ammonium phosphate, dibasic ($(NH_4)_2HPO_4$) or other soluble alkali phosphates. The preferred salts are aluminum nitrate and ammonium phosphate.

Stoichiometric amounts of the aluminum and phosphate salts are preferred, as described above. Use of P/Al ratios of 0.8 to 1.0 is significant in that the resulting solution yields a single phase, clear (i.e., homogeneous), bulk hydrogel upon neutralization. This contrasts with prior art aluminum phosphate compositions such as disclosed in U.S. Pat. No. 4,364,842 (McDaniels) in which the lower P/Al results in a white gelatinons precipitate, which is considered to be a two-phase system of precipitate and hydrogel.

The selected salts (one or more, each, of aluminum and phosphate) are dissolved in water, in a P/Al of approximately 1.0, to form an acidic aqueous solution, pH about 2.0. It may be necessary to heat the water slightly to form a solution. The solution is then cooled. For reasons of economy, ambient temperatures are preferred for the preparation of the hydrogel, but the composition may be kept slightly warmer or cooler if desired.

A hydrogel is prepared by neutralizing the acidic aqueous solution and then allowing the neutralized composition to gel. Neutralization to 90–100% is preferred, although the calculated percent neutralization may be somewhat over 100%. The pH of the neutralized composition is not critical but it should be kept low enough to avoid precipitation. The quantity of base used in this step is calculated from the stoichiometry of the reaction. One hundred percent neutralization refers to conversion of all nitrate to $NH_4NO_3$, which has a pH of 3.5 to 4.5 in water. Thus, at 100% neutralization, the pH will be about 4.0.

Ammonium hydroxide, preferably 30% ammonia, is conveniently used for neutralization. The base is added to the aqueous aluminum phosphate solution slowly, to avoid formation of a precipitate, and with vigorous agitation. The neutralized solution, now a vicous mass, forms a clear, homogeneous hydrogel at ambient temperatures. Typically, after about 3.0 hours the gel is firm enough to be handled in the subsequent processing steps.

The resulting aluminum phosphate hydrogel is subjected to a second neutralization. The hydrogel, which may be cut into chunks or pieces for ease in handling, is soaked in an aqueous basic solution. The basic solution must be of sufficient volume to cover the hydrogel and of sufficient strength to yield an end pH of about 8.0 to 9.0. Ammonium hydroxide is preferred, although sodium hydroxide also may be used. The hydrogel is removed from the soak solution and washed thoroughly with hot dilute base, such as ammonium hydroxide or ammonium carbonate, dibasic. It is preferred to use ammonium hydroxide (pH 10.0) at about 60.0° to 90.0° C., preferably about 85.0° C., in a continuous flow-through system, washing for about 10.0 to 30.0 hours.

This hot base wash strengthens the hydrogel structure and maximizes the porosity of the aluminum phosphate compositions during water removal. Thus, the method of hydrogel preparation described above results in a homogeneous bulk hydrogel with good pore volume in the initial gel structure and in which the potential pore volume is essentially preserved by the hot base washing step. The result is the preparation of aluminum phosphate compositions with P/Al of 0.8 to 1.0 which exhibit exceptionally high porosity. The compositions have high pore volumes of at least 1.0 cc/gm, preferably at least about 1.3 to 1.6 cc/gm. These pore volumes represent almost twice as much porosity as the pore volumes of most prior aluminum phosphate compositions at similar P/Al. For example, McDaniel '842 discloses a composition at P/Al=8.0 which has a pore volume of only 0.84 cc/gm.

As a key to this invention, the high pore volumes as described are uniquely combined with relatively low surface area. For example, the surface area of the inventive compositions preferably is about 200–400 $m^2$/gm. This combination assures the high porosity of the aluminum phosphates of the present invention. As described below, these compounds necessarily have high average pore diameters.

The washed hydrogel is exchanged with any alcohol soluble in water, or with acetone or ethyl acetate, in several soak/drain steps, for example, about 6–8 soak/drain repetitions. Alternatively, the washed hydrogel may be exchanged with heavier alcohols, such as n-hexanol, followed by azeotropic distillation. The hydrogel is then dried to the desired total volatiles (TV) content, which will depend on the particular use intended for the aluminum phosphate composition.

Aluminum phosphate compositions prepared in this manner can be expected to have the following unique combination of characteristics: The total pore volume (PV) will be at least 1.0 cc/gm, and preferably about 1.3 to 1.6 cc/gm. The surface area (SA), measured by the nitrogen Brunauer-Emmett-Teller (BET) surface area method described in Brunauer et at., J. Am. Chem. Soc., Vol. 60, p. 309 (1938), may range from about 200.0 to 400.0 $m^2$/gm, preferably about 250–400 $m^2$/gm. The indicated combination of high PV and low SA necessarily results in the compositions porosity being contained in pores such that the average pore diameter (hereinafter "APD") is high. The APD is calculated in the following manner, based on measured PV and SA:

$$APD(\text{Å}) = \frac{4 \times PV(\text{cc/gm}) \times 10^4}{SA(m^2/\text{gm})}.$$

This formula provides a convenient method of predicting APD, The calculated APD values are verifiable by nitrogen desorption isotherm measurements.

The relationship between PV and SA in this respect can be seen. In the compositions of this invention, having high measured pore volume and low measured surface area, the calculated (or measured) average pore diameter will be high. The high porosity of these compositions is thus based both on high pore volume and on pore volume contained in large diameter pores. The compositions have PV and SA values such that the combination of these two values yield a calculated APD of at least 125 Å. More preferably, the calculated APD is at least about 150 Å. Other characteristics of these compositions are typical of aluminum phosphates in general.

It is expected that the improved aluminum phosphate compositions of this invention will find utility where conventional aluminum phosphates are used, with the added advantages of their high porosity. For example, the compositions may be used as cracking catalysts after sizing to an average of about 80.0 to 100.0 microns, then heating to about 1000.0° F. (538.0° C.) to remove all ammonia. For use as flatting agents, carriers or thickeners, the compositions are sized to about 1.0 to 20.0 microns, as desired, and typically are used at about 10.0% TV. The compositions also are useful as supports for polymerization catalysts.

Where the compositions are used as supports for polymerization catalysts, the catalytically active agent, i.e., chromium, may be added either by incorporation into the aluminum phosphate gel or by impregnation on the formed support composition. In addition to chromium, other promoters such as boron, silicon or titanium may be present. The active agent or agents may be added initially to the aqueous solution of aluminum and phosphate ions in order to form a cogel with the aluminum phosphate or may be added to the aluminum phosphate material by post-impregnation.

For post-impregnation of the catalytically active agent, the aluminum phosphate supports may be prepared as described above and then impregnated with the desired agent or agents. For example, the dried aluminum phosphate support material may be soaked in a solution of catalyst material (i.e., an isopropanol solution of $Cr(NO_3)_3.9H_2O$) and then dried. Typically, about 1.0 to about 5.0% chromium on a total solids basis is used. Any convenient soluble chromium salt may be used, provided that the pH of the solution should not be low enough (i.e., pH less than about 3.0) to dissolve aluminum from the aluminum phosphate composition. In addition, it may be desired to add boron, silicon or titanium. Alternatively, the catalytically active agent or agents may be incorporated into the aluminum phosphate material itself by cogelling. In this embodiment, the agent is added to the initial solution containing aluminum and phosphate ions. For example, chromic nitrate ($Cr(NO_3)_3.9H_2O$), may be dissolved in the initial aqueous solution. The catalytically active aluminum phosphate cogel is then prepared according to the procedures described above.

The examples which follow are given for illustrative purposes and are not meant to limit the invention described herein. The following abbreviations have been used throughout in describing the invention:

| | | |
|---|---|---|
| $AlPO_4$ | = | aluminum phosphate |
| APD | = | average pore diameter |
| BET | = | Brunauer-Emmett-Teller |
| °C. | = | degrees Centigrade |
| cc | = | cubic centimeter(s) |
| conc | = | concentrated |
| D.I. | = | de-ionized |
| gal. | = | gallon(s) |
| gm | = | gram(s) |
| hr | = | hour(s) |
| $m^2$ | = | square meter(s) |
| min | = | minute(s) |
| P/Al | = | phosphorus-to-aluminum ratio |
| psig | = | pounds per square inch guage |
| PV | = | pore volume |
| % | = | percent |
| SA | = | surface area |
| TV | = | total volatiles |
| vol | = | volume |
| wt | = | weight |

EXAMPLE I

The following ingredients were added to a beaker and heated to about 80° C.: 1,237.5 gm $Al(NO_3)_3.9H_2O$ and 198.0 gm $H_2O$. After forming a complete solution, the mixture was stirred and 342.0 gm $NH_4H_2PO_4$ were dissolved in it. The solution was allowed to cool to ambient temperature. The calculated P/Al ratio was 0.90.

First Neutralization—Next, 538.6 gm of the cooled solution were added to a Waring blender and 127.0 cc of concentrated $NH_4OH$ (30% $NH_3$) were added slowly (over 39.0 min) with vigorous agitation. The resulting viscous mass was transferred to a beaker and allowed to stand overnight to gel. The calculated percent neutralization (to $NH_4NO_3$) was 96.0%, and the calculated final solids content as $Al_4+Al_2O^3$ was 17.6%.

Second Neutralization—The aluminum phosphate hydrogel was cut into chunks (about 1.0 inch) and 514.5 gm of chunks were transferred to another beaker, covered with a water solution containing 65.0 cc concentrated $NH_4OH$ and allowed to stand overnight. The soak solution (final pH of 8.5) was decanted and the hydrogel transferred to another container for washing.

Washing—The hydrogel was washed in a continuous flow-through system with 85° C. dilute $NH_4OH$ (pH 10.0) for 19 hours. The washed hydrogel was then exchanged with acetone in seven soak/drain steps, and dried overnight in a vacuum oven at 145° C. The final product was found to have the following properties:

| | | |
|---|---|---|
| TV (at 1750° F.) | = | 12.3% |
| PV | = | 1.43 cc/gm |
| BET SA | = | 330.0 $m^2$/gm |
| APD | = | 151Å |

EXAMPLE II

The procedures of Example I were followed, with the following differences:

| | | |
|---|---|---|
| Initial Ingredients: | | |
| $Al(NO_3)_3.9H_2O$ | 1200.0 | gm |
| $Cr(NO_3)_3.9H_2O$ | 57.6 | gm |
| $NH_4H_2PO_4$ | 331.3 | gm |
| $H_2O$ | 192.0 | gm |
| Calculated P/Al | 0.90 | |
| Calculated P/(Al + Cr) | 0.86 | |
| First Neutralization: | | |
| Wt. of solution | 556.5 | gm |
| Vol. conc $NH_4OH$ | 133.5 | cc |
| Time of Addition | 44.0 | min |
| Calculated % neutr. | 95.0% | |
| Calculated final solids | 17.5% | |
| Second Neutralization: | | |
| Wt. hydrogel chunk | 566.5 | gm |
| Conc $NH_4OH$ in soak | 70.0 | cc |
| Final pH of soak | 8.2 | |
| Washing: | | |
| Time | 21.0 | hr |
| Exchanged with ethanol in eight soak/drain steps | | |
| Vacuum oven | 114.0° C. | |
| Product Analysis: | | |
| TV = | 12.8% | |
| PV = | 1.25 | cc/gm |
| BET SA = | 395.0 | $m^2$/gm |
| APD = | 127Å | |
| Cr = | 2.2% | |

EXAMPLE III

The procedures of Example I were followed with the indicated differences. The first solution was divided into three portions and to each portion additional ingredients were added before the first neutralization in order to vary the P/Al.

| Initial Ingredients: | | | |
|---|---|---|---|
| $Al(NO_3)_3.9H_2O$ | | 1200.0 gm | |
| $NH_4H_2PO_4$ | | 368.0 gm | |
| $H_2O$ | | 144.0 gm | |
| | A | B | C |
| Divided Solution: | | | |
| Wt. of Solution (gm) | 535.0 | 535.00 | 535.0 |
| Extra $H_2O$ (cc) | 15.0 | 5.00 | 0.0 |
| Extra $Al(NO_3)_3.9H_2O$ (gm) | 0.0 | 15.00 | 41.6 |
| Calculated P/Al | 1.0 | 0.96 | 0.9 |
| First Neutralization: | | | |
| Vol. conc $NH_4OH$ (cc) | 132.5 | 146.0 | 157.5 |
| Time of Addition (min) | 38.0 | 42.0 | 36.0 |
| Gel pH | 2.6 | — | — |
| Calc. % neutr. | 105.0 | 109.0 | 107.0 |
| Calculated final solids | 18.2% | 18.1% | 17.8% |
| Second Neutralization: | | | |
| Aging (hr.)* | 4.0 | 4.0 | 3.0 |
| Wt. chunks (gm) | 556.0 | 596.0 | 631.0 |
| Conc $NH_4OH$ in soak (cc) | 63.0 | 70.0 | 75.0 |
| Final pH of soak | 8.4 | 8.4 | 8.4 |
| Washing: | | | |
| Time | | 26.0 hrs | |
| Exchanged with ethanol as in Example II. | | | |
| Vacuum oven | | 168.0° C. | |
| | A | B | C |
| Product Analysis: | | | |
| Calculated P/Al | 1.00 | 0.96 | 0.90 |
| TV (%) | 15.30 | 13.20 | 16.70 |
| PV (cc/gm) | 1.43 | 1.45 | 1.44 |
| BET SA ($m^2$/gm) | 348.00 | 378.00 | 408.00 |
| APD (Å) | 164 | 153 | 141 |

*Time between First and Second Neutralizations

EXAMPLE IV

The procedures of Example I were followed, with the indicated differences. The first solution was divided into four portions, with the speed of addition of $NH_4OH$ in the First Neutralization differing for each portion.

| Initial Ingredients: | | | | |
|---|---|---|---|---|
| $Al(NO_3)_3.9H_2O$ | | 1604.4 gm | | |
| $NH_4H_2PO_4$ | | 483.0 gm | | |
| $H_2O$ | | 189.0 gm | | |
| Calc P/Al | | 0.98 | | |
| | A | B | C | D |
| First Neutralization: | | | | |
| Wt. of Soln. (gm) | 542.0 | 542.0 | 542.0 | 542.0 |
| Vol. conc $NH_4OH$ (cc) | 124.0 | 125.0 | 125.0 | 122.0 |
| Time of Addition (min) | 42.0 | 35.0 | 31.0 | 34.0 |
| Gel pH | 3.0 | — | — | — |
| Calculated % solids | 18.8 | 18.8 | 18.8 | 18.8 |
| Calc. % neutr. | 96.0 | 97.0 | 97.0 | 94.0 |
| Second Neutralization: | | | | |
| Aging (hr.) | 4.0 | 4.0 | 4.0 | 4.0 |
| Wt. chunks (gm) | 543.0 | 549.0 | 572.0 | 555.0 |
| Conc $NH_4OH$ in soak (cc) | 70.0 | 70.0 | 70.0 | 70.0 |
| Final pH of soak | 9.1 | 9.1 | 9.0 | 9.1 |

Washing

The four portions were washed as in Example I for 24 hours, exchanged with ethanol as in Example II and then combined into one batch which was dried overnight in a vacuum oven at 196° C.

| Product Analysis: | | |
|---|---|---|
| Calc. P/Al | = | 0.98 |
| TV (%) | = | 12.60 |
| PV (cc/gm) | = | 1.53 |
| BET SA ($m^2$/gm) | = | 363.00 |
| APD (Å) | = | 169 |

EXAMPLE V

This Example demonstrates the utility of catalysts prepared from the materials made in Examples II and III(B) for the polymerization of ethylene. The material from Example II already contained chromium as the catalytically active ingredient, incorporated by co-gelling. The second catalyst was prepared from product B of Example III by post-impregnation with chromium by wetting 46.0 gm of product III(B) with 64.0 cc of a $Cr(NO_3)_3$ solution (0.672% Cr) in 70% isopropanol to incipient wetness, followed by drying in a vacuum oven for 15 hours at 167.0° C. Both catalysts were used in powder form, after pestling and screening through an 80 mesh screen.

For each catalyst preparation, about 30.0 cc of freshly prepared catalyst was fluidized in a 4.5 cm (diameter) quartz tube having a sintered frit to support the sample. The fluidizing medium was air, predried to less than −100.0° F. (−73.0° C.) dew point by passage through activated silica gel and alumina beds. The fluidized bed was heated at the rate of 400° C./hour to 705° C. and kept at that temperature for five hours. After activation, the quartz tube with the sample was cooled to ambient temperature and the activated catalyst was transferred to a glass container for storage. All handling of the activated material was done under nitrogen.

Evaluation of the activated catalysts for ethylene polymerization activity was done at 101° to 103° C. in a two-liter stirred autoclave. Temperature was held constant to within 0.5° C. by adjusting the pressure of boiling methanol in the jacket surrounding the reactor. After heating the nitrogen-filled reactor to about 102° C., about 0.05 gm activated catalyst was charged under nitrogen blanket, followed by about 1.0 liter liquid isobutane purified through activated charcoal and alumina columns. Stirring was begun and ethylene was supplied on demand to maintain 550.0 psig. Under these conditions, the polyethylene product does not dissolve in the isobutane but remains in slurry form. After the reactor was pressurized, 7.4 cc 1-hexene were added and the reaction was allowed to proceed. It was terminated by venting off isobutane and excess ethylene from the reactor. The conditions and results of the two tests are as follows:

| | Catalyst II | Catalyst III(B) |
|---|---|---|
| Reaction temperature (°C.) | 101.0 | 103.0 |
| Catalyst wt (gm) | 0.064 | 0.055 |
| Reaction time (min) | 164.0 | 90.0 |
| Polyethylene (gm) | 224.0 | 57.0 |
| Melt Index[1] | 0.01 | — |
| High Load Melt Index[2] | — | 8.9 |

[1]ASTM Proc. D1238-79, Cond. E. Proc. A.
[2]ASTM Proc. D1238-79, Cond. F. Proc. B.

The results demonstrate that both aluminum phosphate supports tested yield polymerization catalysts which can produce large quantities of polyethylene in short reaction times.

EXAMPLE VI

A solution of the following was prepared according to the procedures described below:

| | |
|---|---|
| 9,626.4 gm | $Al(NO_3)_3.9H_2O$ |
| 2,898.0 gm | $NH_4H_2PO_4$ |
| 1,134.0 gm | D.I. $H_2O$ |
| 13,658.4 gm | Total |

In a covered container, the aluminum nitrate and water were mixed and heated to 80° C. to form a clear solution. The ammonium phosphate was added and the solution heated back up to 80° C., then cooled to room temperature.

The prepared solution was pumped (at a flow rate of 250.0 gm/min). with ammonium hydroxide (29.0%) (at a flow rate of 47.7 gm/min), into a 200 cc reactor with two inlet streams and extremely turbulent mixing. High aluminum nitrate/ammonium phosphate concentration and low ammonium hydroxide concentration were used to prevent precipitation. The run-off pH was 2.10. The reactor was cooled to 53°–55° C. and held at that temperature during the run. Run-off from the reactor appeared very slightly white, translucent and with few small white particles floating in it. Correct sol began setting within five minutes.

The gel was aged for approximately 18 hours, then cut into one-inch chunks and soaked in an ammonium hydroxide solution prepared according to the following:

| | |
|---|---|
| 12,000.0 gm | "as-is" gel |
| 1,700.0 gm | 29.0% ammonium-hydroxide |
| 10.0 gal. | D.I. $H_2O$ |

The gel was soaked for 18–24 hours with occasional agitation. The pH of the liquid after soaking was 8.7–9.0. The liquid was drained and the hydrogel washed with ammonium hydroxide (pH 10) at 85° C. for 29 hours. The wash flow rate for 12,000.0 gm gel was 550–600 cc/min. After washing, the liquid was drained and the gel allowed to cool in a covered tank.

The hydrogel was then exchanged with ethanol by pouring 10.0 liters of ethanol over 12,000.0 gm gel and agitating occasionally. The ethanol was drained after 2–3 hours. This ethanol exchange step was repeated eight times. The seventh exchange was allowed to set overnight. After eight exchanges, the gel was drained completely and put into a hot vacuum oven (150° C.). After two hours, the temperature was increased to 200° C. After drying overnight, the gel was removed from the oven and sized so the final product would pass through an 80 mesh screen, staying on a 270 mesh screen. The final product was found to have the following properties:

| | | |
|---|---|---|
| TV (at 1750° F.) | = | 14.3% |
| PV | = | 1.42 cc/gm |
| BET SA | = | 267.0 $m^2$/gm |
| APD | = | 213Å |
| P/Al | = | 0.82 |

The principles, preferred embodiments and modes of operation of the present invention have been described in the foregoing specification. The invention which is intended to be protected herein, however, is not to be construed as limited to the particular forms disclosed, since these are to be regarded as illustrative, rather than restrictive. Variations and changes may be made by those skilled in the art without departing from the spirit of the invention.

I claim:

1. A process for preparing high pore volume, homogeneous aluminum phosphate compositions comprising:
   (a) dissolving one or more aluminum salts and one or more phosphate salts in water to form an acidic aqueous solution having a P/Al ratio of about [.9:1] *0.8:1* to about 1:1,
   (b) partially neutralizing the acidic aqueous solution by the slow addition of base with vigorous agitation,
   (c) allowing the partially neutralized solution to gel,
   (d) neutralizing the hydrogel formed in step (c) by soaking [for about 10 to 30 hours] in an aqueous basic solution *of sufficient volume to cover the hydrogel and sufficient strength to yield an end pH of about 8.0–9.0* and then washing with hot dilute base, said hot dilute base *being* at a temperature of about 60.0° to 90.0° C.,
   (e) exchanging the washed hydrogel with alcohol, acetone or ethyl acetate, and
   (f) drying the exchanged hydrogel to obtain the composition.

2. The process of claim 1 in which the pH of the partially neutralized solution of step (b) is less then about 5.0.

3. The process of claim 1 in which said temperature is about 85.0° C.

4. A process for preparing high pore volume, homogeneous aluminum phosphate compositions comprising:
   (a) dissolving aluminum nitrate, aluminum chloride hydrate, aluminum bromide, aluminum bromate, aluminum chlorate or aluminum iodide hydrate and orthophosphoric acid, ammonium phosphate or ammonium phosphate, dibasic, in water to form an acidic aqueous solution having a P/Al ratio of about [.9:1] *0.8:1* to about 1:1.
   (b) partially neutralizing the acidic aqueous solution by the slow addition of ammonium hydroxide with vigorous agitation,
   (c) allowing the partially neutralized solution to gel,
   (d) neutralizing the hydrogel formed in step (c) by soaking [for about 10 to 30 hours] in an aqueous ammonium hydroxide or sodium hydroxide solution *of sufficient volume to cover the hydrogel and sufficient strength to yield an end pH of about 8.0–9.0* and then washing with hot dilute base, said hot dilute base *being* at a temperature of about 60.0° to 90.0° C., [and] said *hot dilute* base being either ammonium hydroxide or ammonium carbonate, dibasic,
   (e) exchanging the washed hydrogel with alcohol, acetone or ethyl acetate, and
   (f) drying the exchanged hydrogel to obtain the composition.

5. A process for preparing high pore volume, homogeneous aluminum phosphate compositions comprising:
   (a) dissolving aluminum nitrate and ammonium phosphate in water to form an acidic aqueous solution having a P/Al ratio of about [.9:1] *0.8:1* to about 1:1, (b) partially neutralizing acidic aqueous solution to about pH 2-3 by the slow addition of ammonium hydroxide with vigorous agitation, (c) allowing the partially neutralized solution to gel, (d) neutralizing the hydrogel formed in step (c) by soaking [for about 10 to 30 hours] in an aqueous ammonium hydroxide solution [to a pH 8-9] *of sufficient volume to cover the hydrogel and sufficient*

*strength to yield an end pH of about 8.0–9.0* and then washing with hot dilute ammonium hydroxide at a temperature of about 85.0° C. *for about 10–30 hours,*

(e) exchanging the washed hydrogel with alcohol or acetone, and (f) drying the exchanged hydrogel to obtain the composition.

* * * * *